No. 618,246. Patented Jan. 24, 1899.
C. DAWSON.
BELT SHIPPER.
(Application filed July 26, 1898.)
(No Model.)
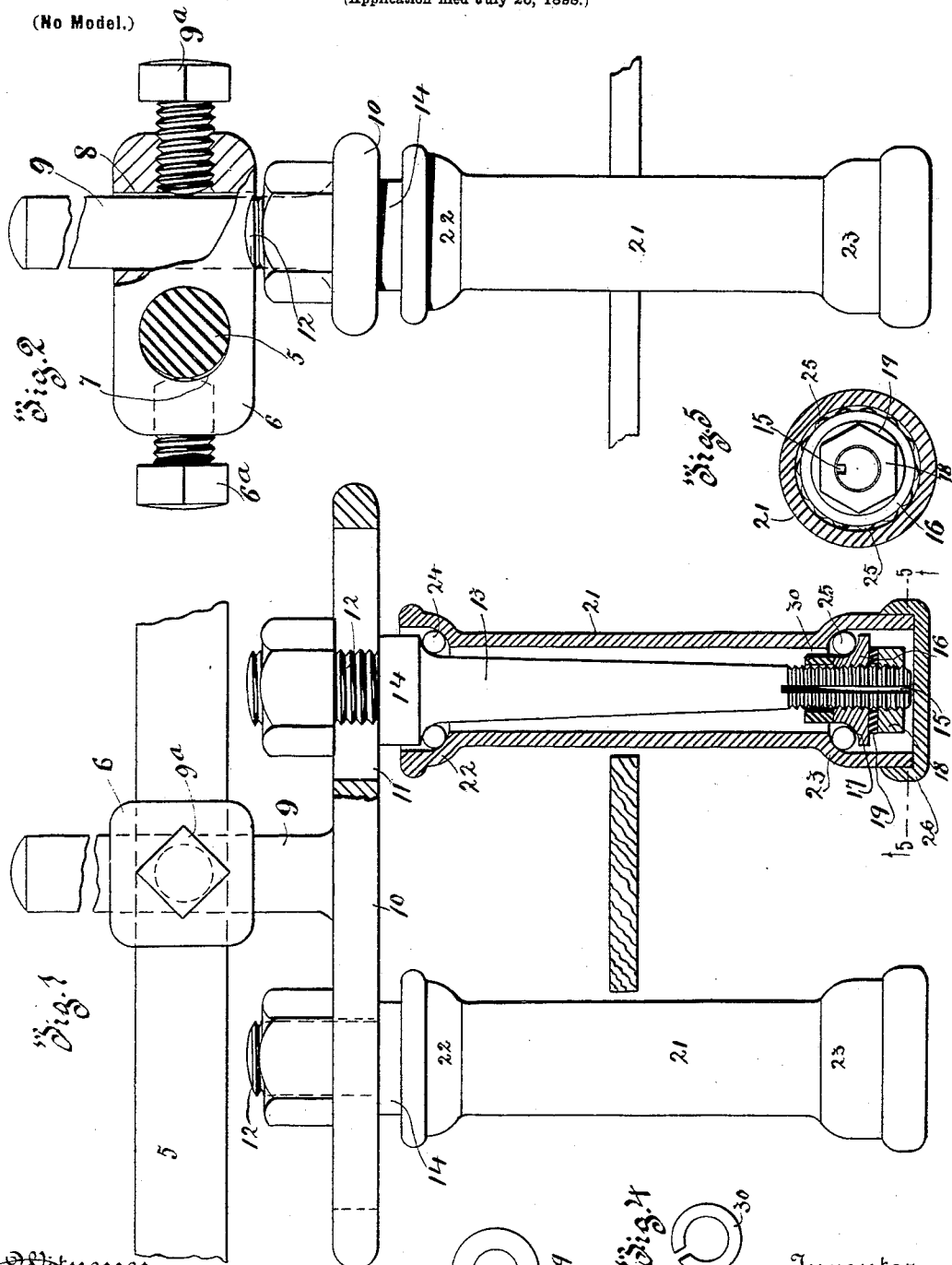

UNITED STATES PATENT OFFICE.

CHARLES DAWSON, OF LACHINE, CANADA, ASSIGNOR OF ONE-HALF TO ELI ADLER, OF SAME PLACE.

BELT-SHIPPER.

SPECIFICATION forming part of Letters Patent No. 618,246, dated January 24, 1899.

Application filed July 26, 1898. Serial No. 686,967. (No model.)

*To all whom it may concern:*

Be it known that I, CHARLES DAWSON, of Lachine, Province of Quebec, Canada, have invented certain new and useful Improvements in Belt-Shippers; and I do hereby declare that the following is a full, clear, and exact description of the same.

My inventon has for its object to provide means for shipping a belt—as, for instance, from a loose to a tight pulley, or vice versa—that will be neither liable to become heated itself nor to cause the belt being shipped to become heated owing to the friction therebetween and the shipper, besides providing an exceedingly durable and therefore inexpensive article.

The invention may be said, briefly, to consist of a forked bracket having a single arm adjustably secured to the shipper-rod and the prongs whereof are adjustable toward and away from one another in order to accommodate various widths of belts, said prongs preferably consisting of a rigid core or trunnion upon which a sleeve is rotatably mounted in a novel and advantageous manner, for full comprehension whereof and of my invention in its entirety reference must be had to the accompanying drawings, forming a part of this specification, in which like symbols indicate the same parts, and wherein—

Figure 1 is a plan view of my improved shipper, illustrating one of the prongs thereof in longitudinal section; Fig. 2, a side elevation thereof; Fig. 3, a plan view of the nut-locking washer; Fig. 4, a plan view of the split bushing for retaining the balls at the outer end of the prong against displacement; and Fig. 5, a transverse horizontal sectional view taken on line 5 5, Fig. 1.

The shipper-rod 5 may be of any approved construction, but preferably round, and receives an oblong block 6, transversely perforated, as at 7, to take over it, and held in place by a set-screw 6ª and provided with a transverse opening 8 at right angles to the perforation 7. This opening 8 receives the shank 9 of the shipper-bracket, which is held against displacement by a set-screw 9ª and is formed with a flat cross-bar 10, having slots 11, adapted to receive the diminished screw-threaded inner end 12 of the rigid cores or trunnions 13, the inner end of each of which is diminished to form a concave shoulder or rigid collar 14, while the main portion is tapered and the end thereof longitudinally grooved, as at 15, and screw-threaded to receive a nut 16, having a concave edge 17 and a jam-nut 18, between which and the nut 16 flexible washer 19, having a spline 20, is located, the spline taking into the groove in the trunnion.

21 is the rotatable sleeve, which has its inner and outer ends flared, as at 22 and 23, respectively, to form concavities, as shown, adapted to, in conjunction with the concave shoulder 14 and the nut 16, form runways for two series of balls 24 and 25, respectively, the end 23 being extended sufficiently in length to overlap the end of the core or trunnion and be closed against dust, &c., by a cap 26.

In assembling the parts of my improved shipper the sleeve 21 is first slipped over the core or trunnion. They are then turned with end 22 of the sleeve uppermost, the series 24 of balls dropped in place, and the sleeve slipped to its normal position. The trunnion and sleeve are then reversed and set with the tapered end of the core or trunnion uppermost. A split bushing 30 is then sprung over said tapered end and forced along it until its outer face is approximately on a line with the inner edge of the concavity at 23. The series of balls 25 are then dropped into place and the nut 16 screwed upon the end of the trunnion until it comes into contact with the bushing 30, thus retaining and establishing a runway for said series of balls 25, the washer 19 being then placed next to said nut 16 and the jam-nut screwed in place tightly against said washer, after which the cap 26 is secured in place.

It is evident that a shipper constructed according to my invention obviates the great defect in belt-shippers heretofore used in that there will be practically no friction between it and the belt, and therefore neither will become heated during the shipping of the belt, thus allowing the use of belts manufactured of rubber, fiber, and other material that could not heretofore be used if shipping were necessary.

What I claim is as follows:

1. A belt-shipper having a shipper-rod, a forked bracket having a single arm adjustably secured to said shipper-rod transversely thereof and means for adjusting said bracket transversely of said shipper-rod, for the purpose set forth.

2. A belt-shipper having a shipper-rod, a forked bracket adjustably secured to said shipper-rod transversely thereof, means for adjusting said bracket transversely and means for adjusting said bracket longitudinally of said shipper-rod, for the purpose set forth.

3. A belt-shipper having a shipper-rod, a forked bracket having a single arm adjustably secured to said shipper-rod transversely thereof, the prongs of said bracket being adjustable toward and away from one another, means for adjusting said prongs; means for adjusting said bracket transversely, and means for adjusting said bracket longitudinally of said shipper-rod, for the purpose set forth.

4. A belt-shipper having a shipper-rod, a forked bracket secured to said rod and consisting of a shank and a cross-piece formed integrally with one another, and a pair of prongs mounted upon said cross-piece and projecting laterally therefrom, said prongs each consisting of a core or trunnion and a sleeve rotatably mounted thereon, for the purpose set forth.

5. In a belt-shipper, a pair of prongs, each consisting of a core or trunnion and an elongated sleeve rotatably mounted thereon, with means for retaining said sleeve in place, as and for the purpose set forth.

6. A belt-shipper having a shipper-rod, a forked bracket secured to said rod and consisting of a shank and a cross-piece formed integrally with one another and a pair of prongs mounted upon said cross-piece and projecting laterally therefrom, said prongs each consisting of a core or trunnion, formed near one end with a rigid collar having a concave face, the ends being screw-threaded and the end adjacent to said collar taking through a slot in said cross-piece, a nut to secure said core or trunnion in place; a nut having a concave edge and adapted to take over the other end; means for retaining said latter nut against displacement; a sleeve adapted to take over said core or trunnion and having its ends flared to provide concavities to register with said concave collar and concave nut and form runways for series of balls; and a series of balls in each of said runways, substantially as described and for the purpose set forth.

In testimony whereof I have affixed my signature in presence of two witnesses.

CHARLES DAWSON.

Witnesses:
WILLIAM P. McFEAT,
FRED J. SEARS.